United States Patent
Danos et al.

(10) Patent No.: US 12,157,681 B1
(45) Date of Patent: *Dec. 3, 2024

(54) METHOD OF PREPARING POTABLE WATER

(71) Applicant: KINETIX PERFORMANCE SOLUTIONS, LLC, Baton Rouge, LA (US)

(72) Inventors: Jason Paul Danos, Baton Rouge, LA (US); Steven Leslie Parrish, Denham Springs, LA (US); Dondi Charles Troxler, Desallemands, LA (US)

(73) Assignee: KINETIX PERFORMANCE SOLUTIONS, LLC, Baton Rouge, LA (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/479,222

(22) Filed: Sep. 20, 2021

Related U.S. Application Data

(63) Continuation-in-part of application No. 17/238,745, filed on Apr. 23, 2021, now Pat. No. 11,858,841, which is a continuation of application No. 15/614,561, filed on Jun. 5, 2017, now Pat. No. 11,008,228.

(51) Int. Cl.
| | |
|---|---|
| *C01B 32/30* | (2017.01) |
| *B01J 20/20* | (2006.01) |
| *B01J 20/28* | (2006.01) |
| *B01J 20/30* | (2006.01) |
| *C01B 32/354* | (2017.01) |
| *C02F 1/28* | (2023.01) |
| *C02F 1/52* | (2023.01) |
| *C02F 1/72* | (2023.01) |
| *C02F 101/32* | (2006.01) |
| *C02F 101/36* | (2006.01) |
| *C02F 103/00* | (2006.01) |

(52) U.S. Cl.
CPC .............. *C02F 1/283* (2013.01); *B01J 20/20* (2013.01); *B01J 20/28016* (2013.01); *B01J 20/3042* (2013.01); *C01B 32/30* (2017.08); *C01B 32/354* (2017.08); *C02F 1/52* (2013.01); *C02F 1/72* (2013.01); *C02F 2101/32* (2013.01); *C02F 2101/327* (2013.01); *C02F 2101/36* (2013.01); *C02F 2103/007* (2013.01)

(58) Field of Classification Search
CPC ....................................................... C01B 32/30
See application file for complete search history.

(56) References Cited

U.S. PATENT DOCUMENTS 11,008,228 B1 * 5/2021 Danos ...................... B01J 20/20

* cited by examiner

*Primary Examiner* — Stuart L Hendrickson
(74) *Attorney, Agent, or Firm* — ROY KIESEL FORD DOODY & NORTH, APLC

(57) ABSTRACT

A method of removing organic carbon and other contaminants from a water stream. The method comprises screening large solids from the stream. Pre-oxidation chemicals may then be added. A coagulant is fed into the stream. An activated carbon, preferably formed from lignite, is added by pumping a highly concentrated activated carbon slurry into the stream. The stream, including the activated carbon and coagulant, next flows into a clarifier, where the coagulant will flocculate and enmesh the activated carbon. The activated carbon adsorbs organic carbon and other contaminants, including bacteria, pharmacological agents, and hydrocarbons, as the stream flows through the clarifier. Eventually, the flocculate will agglomerate and settle out in the clarifier, where it, the enmeshed carbon, and the contaminants they contain may be removed. The stream's organic carbon content exiting the clarifier will be much reduced. Accordingly, less primary oxidizing agent will be needed to treat any remaining organic carbon.

34 Claims, 5 Drawing Sheets

|  | Stream 1 | Stream 2 |
|---|---|---|
| Flow (MGD) | 1.404 | 1.404 |
| Chlorine (lbs/day) | 26.35 | 23.42 |
| Activated Carbon | | |
| (mg/L added to stream) | 0 | 10 |
| (Kg added over 5 days) | 0 | 265 |
| FAC (mg/L in effluent) | > 2.28 | > 2.28 |

FIG. 3

METHOD OF PREPARING POTABLE WATER

PRIORITY CLAIM

This application is a continuation-in-part of, and claims benefit to co-pending U.S. patent application Ser. No. 17/238,745 which claimed benefit to U.S. patent application Ser. No. 15/614,561, filed on Jun. 5, 2017, and now U.S. Pat. No. 11,008,228, both of which are hereby incorporated by reference in their entirety.

BACKGROUND OF THE INVENTION

Field of the Invention

The invention relates to water treatment in general and treatment of drinking water in particular.

Prior Art

Much drinking water comes from surface water sources, such as rivers, lakes, and artificial impoundments or reservoirs. Water from these sources has varying degrees of impurities that must be removed or treated before the water is safe to drink. One contaminant present in many surface water sources is organic matter. Sources of organic matter include decaying plants and animals, urea, fertilizer, and other materials commonly present in surface water. Organic material in water will support bacteria. The bacteria consume oxygen as they breakdown organic material. The bacterial consumption of oxygen is measured as BOD, or biological oxygen demand. It is a key metric in assessing and treating water that is to be rendered potable. BOD should be low before water is safe to drink or, in the case of wastewater, safe to discharge in surface waters.

A shorthand measure of BOD is total organic carbon or TOC. There can be other sources of BOD in water besides organic carbon, such as nitrogen, but organic carbon is often a major component of BOD.

Another way of measuring organic carbon present in water is chemical oxygen demand or COD. Strong oxidizing agents such as potassium dichromate will reduce most organic carbon to carbon dioxide under acidic conditions. Oxygen is consumed in the reaction. This allows the amount of organic carbon present to be determined. An oxidizing agent is added to a sample of the water to be rendered potable, and the reduction of dissolved oxygen in the sample is measured. The measured reduction in oxygen indicates the organic carbon present in the sample.

Organic material present in water must be treated before the water is safe to drink. One way of treating the organic material is to add oxidizing agents, such as chlorine, to the water. As indicated above, most organic carbon can be reduced to carbon dioxide. However, treatment of water streams with chlorine can produce numerous chlorination disinfection by-products—many of which are undesirable. Some of these by-products include haloacetic acids: mono- di-, and trichloroacetic acids; mono- and dibromoacetic acids; and bromochloroacetic acid-collectively, HAA's. Another chlorination byproduct is trihalomethane (THM). Monitoring is required for many chlorination by-products, and excessive amounts will render water unsuitable for human consumption.

Surface waters frequently contain other contaminants. Pharmaceuticals, including antibiotics such as sulfamethoxazole (SMX) and sulfamethanzine (SMZ), will pass through the people or animals that use them, frequently without substantial pharmacological alteration. Once excreted, such drugs often find their way into the surface waters. The presence of these and other drugs in the water stream, particularly when they end up in potable water, is believed to accelerate the development of drug resistant pathogens.

A variety of bacteria are commonly present in surface waters. Some of these include cyanobacteria and actinomycetes. Both of these bacteria produce 2-methylisoborneal (MIB) and trans-1, 10-dimethyl-trans-9-decalol (Geosmin). Humans are sensitive to the smell of MIB and Geosmin at extremely low levels-parts per trillion. Geosmin and MIB have a very unpleasant, earthy odor. When MIB and/or Geosmin is present in water, the taste and odor of the water can be compromised. Other biological contaminants, such as Synura and other algae, can release chemicals that adversely effect the taste and odor of water.

Hydrocarbons from land or water based dumping, water craft engine exhaust, spills, and natural seepage are not infrequently found in surface waters. Their presence can also compromise the taste and odor of water, in addition to posing a health risk if consumed.

Accordingly, a method of removing organic carbon and other contaminants from water in the course of rendering the water potable is desired.

OBJECTS OF THE INVENTION

It is an object of the invention to remove organic carbon from water streams.

It is another object of the invention to remove organic carbon without oxidation.

It is yet another object of the invention to minimize the amount of oxidizing agents needed to render water potable.

It is still another object of the invention to minimize the amount of chlorination by-products present in a water stream.

It is yet another object of the invention to remove bacterial contaminants from a water stream.

It is still another object of the invention to remove pharmacological contaminants from a water stream.

It is yet another object of the invention to remove hydrocarbon-based contaminants from a water stream.

It is still another object of the invention to remove contaminants that adversely effect the taste and odor of water.

It is yet another object of the invention to suspend high concentrations of powdered activated carbon in a pumpable slurry.

It is still another object of the invention to create a highly concentrated activated carbon slurry that can be transported in a container and returned to a pumpable state with minimal agitation.

It is yet another object of the invention to introduce powdered activated carbon to a water stream.

SUMMARY OF THE INVENTION

A method of removing organic carbon and other contaminants from a water stream is disclosed. The method comprises physically screening large solids and debris from the water stream. Pre-oxidation chemicals may be added to the stream. Following the initial filtration and pre-oxidation, if any, activated carbon preferably formed from lignite is added by pumping a highly concentrated activated carbon slurry into the water stream. The slurry comprises an aqueous suspension formed using polymers to help suspend the activated carbon. The slurried activated carbon may be easily pumped using conventional liquid handling equipment.

A coagulant is also fed into the stream before, contemporaneously with, or after the activated carbon. The water stream, including the activated carbon and coagulant, next flows into a clarifier. The coagulant will flocculate to form a suspended bed in the quiescent zone of the clarifier. The activated carbon will become enmeshed in the suspended bed. The direction of flow through the clarifier will require the stream to pass through the bed to exit the clarifier. As the stream passes through the bed, the activated carbon contained therein will adsorb organic carbon and other contaminants, including bacteria, pharmacological agents, and hydrocarbons.

As the flocculate ensnares more contaminants and agglomerates with other flocculates it will eventually become heavy enough to settle out of the stream or it will be removed via forced blow down. In either case, the flocculated coagulant, together with the activated carbon and the contaminants contained therein may be physically removed from the clarifier. The water stream exiting the clarifier will have much lower organic carbon content than the water stream entering. Accordingly, smaller amounts of oxidizing agents, such as chlorine, will be needed to treat the remaining organic carbon. This will result in the formation of fewer chlorination by-products such as THM and HAA's. Other contaminants in the water stream, including bacteria, pharmacological agents, and hydrocarbons, will be similarly reduced. While the resulting water stream will usually still need to be treated before it is rendered potable, fewer potential sources of Geosmin, MIB, or other taste and odor compromising agents will remain.

BRIEF DESCRIPTION OF THE DRAWINGS

FIG. 3 is a chart illustrating the chlorine results of the experiment discussed in example 1.

DETAILED DESCRIPTION OF THE BEST MODE

Figure 1:
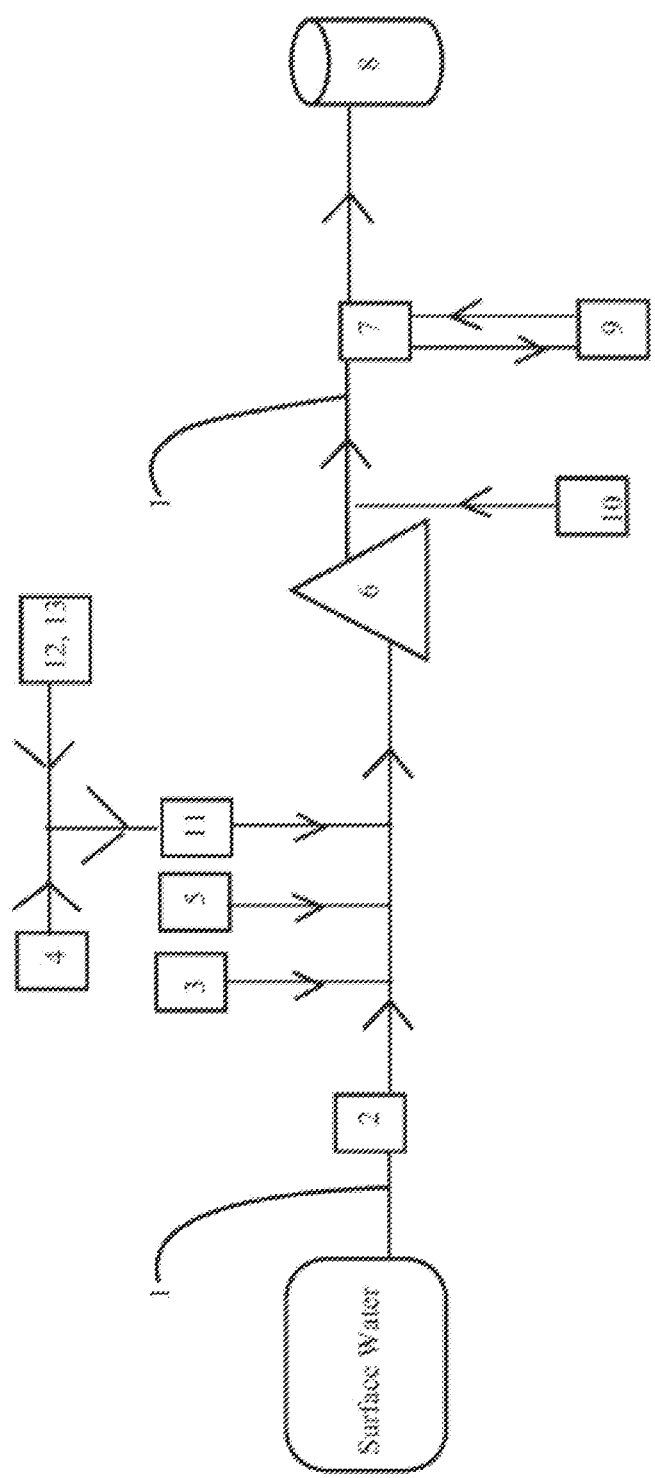
FIG. 1 is a schematic view of the steps in the preferred method of water treatment disclosed herein.

A raw water stream 1 will be drawn into a treatment facility, typically by pumping stream 1 from a lake, river, stream, or reservoir. Raw water in stream 1 could come from a ground water well. However, ground water typically includes many fewer contaminants than surface water. Thus, many of the steps disclosed herein will be most applicable to surface water treatment. That being said, the utility of the steps disclosed herein will depend upon the contaminants in stream 1, not its source.

Stream 1 will be passed through one or more screens 2. The object of screens 2 is to remove debris and other solids from stream 1. The primary targets of screens 2 will be things like fish, plants, litter, and most large objects that may be present in surface waters. Screens 2 may also include some finer filtration as well. However, in most embodiments screening is primarily directed toward larger objects.

Next, a pre-oxidant 3 (sometimes referred to herein as a secondary oxidant) may be added to stream 1. Pre-oxidants 3 include chemicals such as chlorine, chlorine dioxide, ozone, and potassium permanganate. These chemicals can oxidize organic carbon, though that is a secondary purpose of adding them at this stage of treatment. At this stage, they are being added to stream 1 predominantly to control bacterial growth. In the preferred embodiment, about 0.1 to about 0.5 mg/L of a halogen pre-oxidant 3 is added to stream 1. (As used herein, the term "about" means plus or minus 10 percent, unless otherwise indicated.)

At this point, it is observed that any addition to stream 1 should be NSF approved. Chemicals used to treat drinking water throughout North America are required to comply with NSF/ANSI 60. The list of chemicals and additives approved under this standard may vary with time. Suitable pre-oxidants 3 and other additives discussed below will likewise vary.

A coagulant 5 is added to stream 1. The preferred coagulant comprises about 10 to 20 percent polydadmac or other cationic polymer and about 30 to 60 percent aluminum chlorohydrate or sodium aluminate. Suitable commercial coagulants include the Floquat® line available from SNF and the Magnafloc® line available from BASF. Coagulant 5 will typically be added to stream 1 at concentrations of between about 3 mg/L and 15 mg/L. Ideally, coagulant 5 will be added as far upstream from clarifier 6 as practical in order to allow dispersal of coagulant 5 across stream 1 prior to entry into clarifier 6. Also, early addition of coagulant 5 will allow coagulation to commence prior to entry of stream 1 into clarifier 6 (discussed below). Coagulant 5 may also help activated carbon 4 (discussed below) stay suspended in stream 1 if coagulant 5 is introduced to stream 1 prior to activated carbon 4. The foregoing notwithstanding, activated carbon 4 may be added before coagulant 5, when convenient.

As indicated above, activated carbon 4 is also added to stream 1. Activated carbon 4 is a carbon source that has been processed to have numerous small pores. Carbon may be activated via chemical activation or steam activation. Steam is the predominant method.

In steam activation, the carbon source is heated in an inert atmosphere. This drives off moisture and volatile components. Temperatures typically stay below about 1300 degrees F. Removal of water and volatile materials will create pores throughout the carbon source.

Superheated steam is then added to the carbon material. Typical temperatures range from about 1600 to about 2000 degrees F. The steam will react with the carbon across the entire surface, including the pores. The steam will convert the surface carbons to carbon monoxide, carbon dioxide, and methane-all gases. As the carbon is gasified, the pores are enlarged substantially. Pore size can be controlled by changing the conditions of steam activation—i.e., varying the temperature, pressure, and/or length of exposure. As a general rule, larger pore sizes are desired for removal of smaller particles.

Activated carbon 4 is then ground to the desired size. Granular material having a diameter of about 1-3 mm is a typical size upon completion of the activation process, with further grinding as desired. In the preferred embodiment, activated carbon 4 is powdered, meaning it has a diameter of less than about 325 mesh (90 percent or more has a diameter of less than about 44 micrometers). Activated carbon 4 preferably has a pore diameter of about 2.2178 nanometers (nm) as measured on the Barret Joyner Halenda adsorption method. While the pore size will vary, in the preferred embodiment, at least about fifty percent of the pores will be of the desired size or larger.

The preferred carbon source for the activated carbon 4 is lignite. Lignite is a form of coal, often referred to as brown coal. It is formed over geologic time scales by the compaction of peat by overlying sediment. Compared to bituminous coal or anthracite, lignite has a much higher moisture content. Lignite will typically be about 30 to 60 percent moisture and sometimes as high as 70 percent moisture. In comparison, bituminous coal and anthracite will both have less than 15 percent moisture. The higher moisture content in lignite is expected to result in more and larger pores in activated carbon 4 when the moisture is driven off, as compared to other, dryer forms of coal.

Lignite also has a lower carbon content than bituminous coal or anthracite. The fixed carbon content—that is, the carbon left after removal of volatiles—is typically only about 25 to 35 percent for lignite, whereas fixed carbon will be in the 45 to 85 percent range for bituminous coal and above 85 percent for anthracite.

Chlorine is another difference between lignite on one hand and bituminous coal and anthracite on the other. Bituminous coal and anthracite have much higher chlorine contents, typically about 340 parts per million (ppm). Chlorine will usually only be about 120 ppm in lignite. Having a chlorine content of less than about 150 ppm is an advantage of using lignite as the carbon source.

Activated carbon 4, preferably formed from lignite, is added to stream 1. Typically, this is done shortly before stream 1 enters clarifier 6. However, there is an obstacle to the addition of activated carbon 4 to stream 1. The powdered carbon must be incorporated into stream 1, and activated carbon is essentially insoluble in water. Adding the powdered activated carbon to a flowing stream will result in the bulk of the carbon clumping uselessly on the stream sides and bottom. Powdered activated carbon also tends to make a mess when attempts are made to introduce it directly to stream 1. Powdered activated carbon is a substantial source of dust and tends to get dispersed onto everything when added dry.

Powdered activated carbon can be suspended in water. Relatively high concentrations can be obtained, but only by maintaining high speed agitation. Typically, bulk fluid velocities of about 40 to 60 ft/min are required. If high speed agitation ceases, the carbon will fall out of suspension and form a cake on the bottom of the carrier. Returning such prior art carbon to suspension is very difficult without direct mechanical agitation of the cake. Thus, carbon in the cake is, for all practical purposes, effectively lost. For large volume suspensions, keeping the carbon from falling out of suspension is quite difficult if the suspension must be transported at all. This poses practical obstacles to getting significant amounts of carbon into suspension in stream 1. To get any substantial amount of carbon into stream 1, mixing must be done on site, and excess volumes of carbon must be used to account for the carbon that will fall out of suspension after it is introduced to stream 1.

The present invention increases the amount of activated carbon that may be suspended in a water stream. A high carbon content slurry 11 is prepared. Relatively low volumes of high concentration slurry 11 may be pumped into stream 1 and allowed to disperse to achieve the desired concentration in stream 1. Concentrations of about 250 gm/L (20% by weight) have been achieved in slurries comprising an aqueous suspension of activated carbon 4 in water.

The initial step in forming high concentration slurry 11 is to prepare an aqueous polymer solution 12. The preferred polymers are non-ionic, low molecular weight polyacrylamide polymers. Typical molecular weights are between about 8,000,000 and 12,000,000.

Suitable polymers include WWC-911H and WWC-906H available from Water Science Technology, located in Bessemer, Alabama, and Superfloc N-300 (7000 LMW) available from Kemira, a global chemical supplier with offices in Houston, Texas.

Polymer solution 12 is made by mixing from about 0.5 percent to about 3.0 percent by weight, and preferably about 1.0 percent by weight polymer into water. The finished solution 12 will be neutral to somewhat acidic (pH of between about 4 and about 7). The preferred polymers should be compatible with the other treatment steps being used on stream 1. The preferred polymer should not adversely react with any coagulant used in stream 1. Similarly, the preferred polymer should not adversely effect the clarifier dynamics. Of course, the polymer selected should be NSF approved.

The amount of polyacyrlamide present in potable water should be minimized. NSF regulations limit the amount of polyacrylamide that may be added to potable water as a filtration aid. In the present application, polyacrylamide is not being added as a filtration aid. Rather, polyacrylamide is being used to form a suspension agent for activated carbon 4. While higher concentrations of polyacrylamide would increase the amount of carbon 4 that may be suspended in slurry 11, it would also limit the amount of polymer solution 12 that could be added to stream 1. In the preferred embodiment, slurry 11 will contain the largest amount of carbon 4 that can be suspended using the smallest amount of polymer.

The preferred polymers are provided in a dry, granular form and should preferably be combined with water using venturi eduction. Water flows through an eduction mixer and the venturi effect creates a vacuum which draws the powdered polymer into the mixing vessel with the water at the desired concentration. When the required concentration is obtained, a high velocity or high shear mixer is used to thoroughly incorporate the polymer into the water. Best results are obtained if polymer solution 12 is allowed to stand for about 24 hours or longer after mixing.

The polymer granules are packed tangles of long molecules. As each molecule absorbs water, it will uncoil. When an ionic polymer is used, the polymers will contain a variety of charged functional groups. As the molecules unwind, the charged functional groups become separated which will tend to repulse the components of adjacent polymers. When present, these repulsive forces will help the polymers separate from the granule. Regardless of the ionic or non-ionic nature of the polymers, the separation process is relatively slow. As each polymer is wetted, it will behave as a highly viscous gel. This will both inhibit the ability of water to reach interior polymers and restrict the movement of each wetted exterior polymer away from the granule.

The mixers referenced above will create turbulence within solution 12. This will tend to pull polymers away from the granule surface and keep the polymers in suspension. Once separated, the polymers will continue to hydrate and unwind. Preferably, this agitation will continue for about 24 hours prior to use of the finished solution 12. Upon completion, polymer solution 12 will serve as a suspension agent 13 for activated carbon 4.

Figure 5:
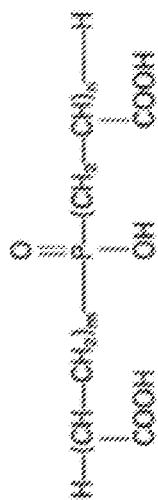
FIG. 5 is a condensed structural formula of a phosphino carboxylic acid polymer.

In another embodiment, suspension agent 13 is made with phosphino carboxylic acid (PCA), a polymer having the formula shown in FIG. 5. As illustrated, the polymer is comprised of two polycarboxylic acid chains joined by a POOH functional group. Suitable phosphino carboxylic acid polymers include Flocon 135™ available from BWA Water Additives, a multinational chemical supplier with offices in Tucker, Georgia. The preferred PCA has a molecular weight between about 500 and 10,000, most preferably between about 3000 and 4000.

When suspension agent 13 is made from phosphino carboxylic acid, it will be formed by mixing into water about 0.1 percent to about 1.5 percent by weight polymer, and more preferably between about 1.2 percent and about 1.5 percent by weight polymer. However, compliance with current NSF regulations will limit the phosphino carboxylic acid content in suspension agent 13 to 0.8 percent by weight. The finished solution will be slightly acidic to slightly basic (pH of 6-9). In the preferred embodiment, it will have a specific gravity of between about 1.08 and 1.10 at 68 degrees F. and a density of between about 9.0 and 9.17 lbs. per gallon. In contrast to the polymer granules discussed above, the preferred form of phosphino carboxylic acid is an aqueous solution. It is miscible in water at all relevant concentrations. It can be added directly to water until the desired concentration of suspension agent 13 is achieved. Minimal mixing is required.

Once suspension agent 13 is ready, activated carbon 4 may be mixed with plain water, usually taken from the tap, a well, or other conventional source. The desired amount of water is added to a mixing tank. Typical blend sizes will be about 5000 to 5500 gallons. Powdered activated carbon 4 is added to the water.

The activated carbon particle size is quite small in the preferred embodiment: ~325 mesh (~45 µm). In part because of the small particle size, care must be taken to avoid dust generation and clumping. An induction mixer can help avoid both. The preferred mixing system is a TDS (transport and dispersing system) induction mixer, such as the Conti-TDS, available from the Ystral company of Ballrechten-Dottingen, Germany. An induction mixer will pull powdered activated carbon 4 from a storage container, mix it with water, and inject the wetted carbon into the center of the mixing tank. This ensures that carbon 4 is both thoroughly wetted and evenly dispersed throughout the fluid in the mixing tank.

In the preferred embodiment, approximately 10,425 pounds of activated carbon 4 will be added to 5000 gallons of water to achieve the desired concentration of 20 percent by weight. Once carbon 4 is thoroughly mixed, suspension agent 13 is added to the mixture.

Agitation on the order of about 40 to 60 feet per minute (bulk fluid velocity) is maintained with an immersed rotation mixer. This ensures that the carbon will remain suspended while suspension agent 13 is introduced.

Suspension agent 13 should be added slowly. Ideally, about 1.25 gallons (about 10 pounds or 4.7 kg) of suspension agent 13 is added per minute. For a 5000 gallon mixture, this is an addition rate of about 0.025 percent by volume per minute. Adding suspension agent 13 more quickly can cause clumping. It may be added more slowly, but agitation should be continuous regardless of the addition rate so activated carbon 4 will remain dispersed while suspension agent 13 is being incorporated.

When the active ingredient in suspension agent 13 is comprised predominantly or entirely of phosphino carboxylic acid, the slow mixing described in the preceding paragraph may be omitted.

Salt is preferably added to the mixture after suspension agent 13 has been fully incorporated. The salt will help maintain the stability of the suspension. NaCl is the preferred salt. The preferred salt concentration is about 1.0 percent by weight. Once aqueous activated carbon slurry 11 has been formed, it will keep for several weeks, if the product is agitated regularly and preferably continuously. However, much lower agitation rates are required to keep the carbon in suspension in slurry 11. Bulk fluid velocity rates on the order of about 6 to 12 feet per minute are sufficient to keep the carbon in suspension.

Preferably, the immersed rotation mixer-essentially a plurality of blades on a rotating shaft-will continue to agitate slurry 11 continuously until slurry 11 is ready for introduction into stream 1.

If agitation of slurry 11 is suspended for ten minutes, at least about 80 percent of carbon 4 will still be in suspension. This can be contrasted with powdered carbon suspended in untreated water. If agitation is suspended for 10 minutes, at least 80 percent of the carbon—and in most cases 100 percent of the carbon—will have fallen out of suspension.

A bigger advantage of slurry 11 occurs if agitation is suspended for hours or days-long enough for substantially all of carbon 4 to fall out of suspension. A major advantage of the present invention over the prior art is that most of carbon 4 may be easily returned to suspension in slurry 11 merely by resuming agitation.

The suspension agent increases the viscosity of slurry 11. This will help suspend much of carbon 4 in the aqueous media so that the slurry behaves like a colloidal suspension—albeit a relatively unstable one—if agitation is interrupted. Settling of the carbon particles is impeded by the viscosity of the media.

When carbon 4 does fall out of suspension in slurry 11, the formation of cake on the bottom of whatever container slurry 11 is in will be impeded. Particles that reach the bottom of the container will not have left the suspension entirely. These carbon particles will still be surrounded by the viscous aqueous media of slurry 11, including the dissolved polymers. The viscous media will inhibit the ability of the carbon to clump together. As a result, the carbon that has fallen out of suspension will remain loosely piled on the bottom of the container. This allows slurry 11 to be formed off-site and transported to the injection site for stream 1 via container, even if the container lacks agitation. While some carbon 4 will fall out of suspension, most carbon 4 may be returned to suspension simply by stirring slurry 11. No physical manipulation of the carbon 4 that has settled out, beyond stirring slurry 11, is required to return most carbon 4 to suspension.

Even after weeks with no agitation, substantially all of carbon 4 may be returned to suspension by subjecting slurry 11 to mild to moderate agitation. Bulk fluid velocities on the order of about 6 to 12 ft/min (mild agitation) are believed to be sufficient to restore carbon 4 to suspension. However, most common commercial agitators can provide agitation on the order of about 18 to 36 ft/min (moderate agitation). Agitation at these rates are more than sufficient to restore settled carbon in slurry 11 to suspension. Significantly, restoration of suspension does not require mechanical raking of carbon that has fallen out of suspension.

It will be appreciated that the ability to restore carbon 4 to suspension after a substantial interruption in the agitation of slurry 11 will facilitate the transport of slurry 11. Slurry 11 may be formed in one location and shipped substantial distances for application. As long as slurry 11 may be agitated upon arrival, slurry 11 can be pumped into stream 1 or other application. Large volumes of slurry 11 may be transported via tanker truck and then pumped out upon the application of agitation to the tanker. The use of a smooth, substantially corner free tanker with sloping sides and a sloping bottom can help restore carbon 4 to suspension. Likewise, the use of hydraulics to impart a slope to a conventional tanker can facilitate the transfer of any carbon 4 that may have settled into an area of the tanker shielded from agitation (i.e., corners and areas distal from the point of discharge).

In the preferred embodiment, carbon slurry 11 will be about 20 percent by weight (250 gm/L) activated carbon 4. When it is desired to introduce activated carbon 4 into stream 1 for treatment, activated carbon 4 may be added by pumping carbon slurry 11 directly into stream 1. By way of example, if an activated carbon concentration of 15 mg/L is desired in a water stream with a flow rate of 5500 liters per minute, only about ⅓ of a liter of 250 gm/L carbon slurry need be pumped into the stream per minute to achieve the desired concentration. Much higher carbon concentrations may be obtained in stream 1 than would be possible by mixing powdered activated carbon 4 directly into stream 1, and the method of introduction is much more convenient. Because activated carbon 4 is in aqueous slurry 11, it may be introduced with a conventional pump, such as a peristaltic metering pump or a diaphragm metering pump suitable for high viscosity fluids. If powdered activated carbon 4 were added directly, some type of solids handling system would be required, such as an induction pump. Such an attempt would be further complicated when the stream being treated is flowing, making re-circulation difficult.

After being pumped into stream 1, aqueous slurry will simply dissipate into the flowing waters of stream 1. No other introduction steps are required to incorporate the activated carbon 4 within slurry 11 into stream 1.

As alluded to above, subsequent to the addition of activated carbon 4, coagulant 5, and any pre-oxidants 3, stream 1 is directed into a clarifier 6. Preferably, stream 1 will enter clarifier 6 shortly after the addition of slurry 11. Clarifier 6 will preferably be an up-flow clarifier. In an up-flow clarifier, water will enter clarifier 6 in an inverted cone 14 (point at top). Inverted cone 14 is contained in a larger tank 15. Tank 15 will usually have walls 19 that diverge from gravitational bottom to top. This will result in tank 15 having an interior space 20 between walls 19 and cone 14 whose cross sectional volume increases from bottom to top. That is, the volume of a slice taken of interior space 20 will be larger than the volume of a similar slice taken below the first slice. Water entering clarifier 6 must flow down through the open bottom 16 of cone 14 to enter tank 15. An outflow line 18 is located in tank 15 well above open bottom 16. This requires water in stream 1 flowing through clarifier 6 to flow down through cone 14 and then up through tank 15 to pass through clarifier 6.

Stream 1 will decelerate after it moves through open bottom 16. Once stream 1 has exited cone 14, it will move upward through interior space 20. As noted above, the volume of interior space 20 will increase from bottom to top. Thus, as stream 1 moves through interior space 20, it will move through a channel of increasing volume, which will cause stream 1 to slow. As stream 1 slows, coagulant 5 and other materials suspended in stream 1 will fall out of suspension. As coagulant 5 falls out of suspension, it will form a bed 17 in the quiescent portion of tank 15. The relatively fast and upwardly flowing water at the bottom of tank 15 will suspend bed 17 above the bottom of tank 15.

As coagulant 5 remains relatively stationary within bed 17, coagulant 5 will flocculate. This is the formation of sponge-like clumps or "flocs" that make up bed 17. The flocs will physically enmesh activated carbon 4. As stream 1 flows through bed 17, activated carbon 4 will capture organic material and other material from stream 1. The flocs will also independently capture bacteria, algae, and other contaminants in stream 1.

A plurality of mixing blades 21 are preferably positioned on a rotating shaft within cone 14. These are intended to help bring contaminants in stream 1 into contact with coagulant 5. However, blades 21 will also help bring carbon particles 4 into contact with coagulant 5. The area within cone 14 agitated by blades 21 is the mixing zone 22.

One or more sludge agitators 23 will preferably be provided below open end 16 of cone 14. These agitators will prevent sludge from building up below open end 16 and obstructing outflow from cone 14.

Activated carbon 4 will have its primary contact time with stream 1 in bed 17, and, to a lesser degree, in mixing zone 22. Contact time will depend upon the fluid mechanics of clarifier 6. However, contact time between the activated carbon 4 suspended in bed 17 and stream 1 flowing through bed 17 will typically range from hours to days. Carbon 4 will commonly remain in bed 17 long enough that contact time is not the limiting factor in the ability of activated carbon 4 to adsorb contaminants from stream 1. The carbon particles are likely to become saturated with contaminants before they exit clarifier 6, as described below. Rather, the more limiting factor is likely to be the rate at which stream 1 flows through clarifier 6 in general, and bed 17 in particular, as well as the concentration of activated carbon 4 within bed 17.

Eventually, under the quiescent conditions of tank 15, the flocs will agglomerate, sticking to one another and capturing more material, until they become heavy enough to fall out of suspension via gravity. Alternatively, a portion of bed 17 may be removed via controlled blow down. Either way, coagulant 5 will settle out into the sludge at the bottom of clarifier 6. The sludge will be physically removed and either discarded or transferred for further treatment.

Stream 1 will flow out of tank 15 via an outflow line 18 located in the upper portion of tank 15. When stream 1 exits tank 15, it should have passed through bed 17, but coagulant 5 and other non-dissolved contents of bed 17 should preferably not be able to exit tank 15 via outflow line 18. This is accomplished by controlling the thickness of bed 17, via forced blowdown or otherwise, before the top of bed 17 reaches outflow line 18. Thus, stream 1 will flow out of clarifier 6 with little or no coagulant 5 or activated carbon 4 still in stream 1. The contaminants captured by coagulant 5 and activated carbon 4 will, likewise, have been removed from stream 1.

Once an equilibrium is established, the amount of carbon 4 added should preferably equal the amount removed per unit time. Otherwise, carbon 4 will increase the mass of bed 17. Such an increase could be managed by increasing the frequency at which bed 17 is drawn down. However, the preferred approach is to match the quantity of carbon 4 in with the amount out.

Once in stream 1, activated carbon 4 will capture dissolved and suspended organic carbon. To the extent that pre-oxidants 3 have formed any chlorination by-products, such as HAA's or THM, activated carbon 4 will also capture them. Contaminants, such as bacteria, hydrocarbons, pharmaceuticals, and algae will be captured as well. Furthermore, to the extent bacteria or algae may have released Geosmin, MIB, or other contaminants that adversely effect taste and smell, the activated carbon will also absorb these contaminants. In short, activated carbon 4 will effect an overall reduction in contaminants present in stream 1. This will primarily occur in bed 17 and mixing zone 22.

Summarizing the process to this point briefly, screen 2 will remove most large solids from stream 1. Coagulant 5 will be added to stream 1, typically shortly after screening though coagulant 5 may be added later when more convenient. A slurry 11 is used to add activated carbon 4 to stream 1. Stream 1 will flow into clarifier 6. Coagulant 5 will form bed 17 within clarifier 6. As stream 1 flows through bed 17, bed 17 will capture and suspend activated carbon 4, which will adsorb from stream 1 many of the contaminants present, including dissolved organic carbon and chlorination by-products that may have been formed by pre-oxidation chemicals, if any. Coagulant 5 will also capture contaminants independently. Coagulant 5 will settle out of stream 1 in clarifier 6, allowing activated carbon 4 and the contaminants captured by activated carbon 4 and/or coagulant 5 to be removed from stream 1.

After exiting clarifier 6, stream 1 will usually still contain some organic carbon and other contaminants that require treatment. Commonly, this treatment will entail the addition of a primary oxidizing agent 10, such as chlorine. However, because of the capture of organic carbon by activated carbon 4, fewer primary oxidizing agents 10 will be required than would otherwise have been needed. This will result in a reduction in the formation of chlorination by-products such as HAA's and THM. The number of agents with a potential adverse effect on odor and flavor, such as Geosmin and MIB producing bacteria, will also have been reduced. The number of pharmaceuticals and hydrocarbons remaining in stream 1 will have been reduced as well. By reducing the number of these contaminants present, the need for their subsequent treatment will be minimized, or in some cases eliminated.

There are also regulations in many jurisdictions limiting the amount of chlorine that may be added to potable water. Reducing the organic carbon in stream 1 will reduce the need for chlorine to oxidize organic carbon, thereby helping ensure compliance with the regulatory limits on chlorine.

Using lignite as the carbon source in activated carbon 4 instead of bituminous coal or anthracite is advantageous, in part, because of the lower chlorine content of lignite. As discussed above, the use of chlorine to oxidize organic carbon in stream 1 can produce undesirable chlorination by-products. Minimizing ancillary sources of chlorine, as well as minimizing chlorine intentionally added to stream 1 as an oxidation or pre-oxidation agent, will help limit the formation of chlorination by-products. Accordingly, forms of coal with lower chlorine content are advantageous relative to higher chlorine carbon sources.

After oxidation, stream 1 will be filtered again. Typically, this involves flowing stream 1 through layers of anthracite, sand, and gravel—a mixed bed filter 7. From there, stream 1 will flow to a storage facility 8, such as an above ground tank, to be held until ready for use.

Most treatment systems will include a clear well 9 downstream from filter 7. Stream 1 will be diverted to clear well 9 as it comes out of filter 7. When clear well 9 is full, clear well 9 will be closed and stream 1 will be directed to storage facility 8. When filter 7 becomes clogged to the point that flow through filter 7 is impeded, inflow to filter 7 will be stopped. Once the water in filter 7 has passed through to storage facility 8, water in clear well 9 will be allowed to back flow into filter 7. Flowing water through filter 7 in the opposite direction from ordinary flow will clean filter 7. Once filter 7 is cleaned, inflow into filter 7 will resume, clear well 9 will be refilled, and outflow from filter 7 will be returned to storage facility 8.

Example 1

A water treatment plant with parallel water streams was identified. This plant had two separate incoming streams with substantially identical characteristics. This allowed one to be tested and the other to be used as a control. Each stream was screened for solids. "Before" samples were taken from each stream post-screening. An activated carbon slurry was then added to the test stream. The activated carbon slurry had a carbon concentration of 250 gm/liter. The activated carbon slurry was added at a rate sufficient to create a carbon concentration of 10 mg per liter in the stream. This was slightly more than about ⅓ of a liter of slurry added per minute to a stream flowing at about 9,100 liters per minute. Over five days, approximately 265 Kg carbon were added to the stream.

The slurry was formed as described above. In addition to water and activated carbon, the slurry included about 1.0 percent by weight Superfloc™ N-300 (7000 LMW) low molecular weight polyacrylamide non-ionic polymer and about 1.0 percent by weight NaCl. The carbon in the activated slurry was 100% lignite based activated carbon. Prior to formation of the slurry, the activated carbon was a 325 mesh powder, meaning that at least 90 percent of the carbon powder had a diameter of 44 microns or smaller. It had an average pore diameter of about 2.2178 nm.

In each stream, the halogen residual was measured continuously. Halogen residual is a measure of free available chlorine (FAC). Essentially, there should be enough chlorine to oxidize the organic carbon in each stream. Organic carbon present in the stream will consume chlorine, causing FAC to fall. If the FAC falls below the plant target, more chlorine (or other halogen, where approved), must be added. The halogen residual was maintained above 2.25 mg/L in each stream; however, to maintain FAC above the target, more chlorine was required to be added to the stream without activated carbon 4 than was needed in the stream with activated carbon 4. These results are shown in FIG. 3.

Jar "after" samples were taken from each stream on five consecutive days. The after samples were taken from the sand filter effluent.

Figure 2:
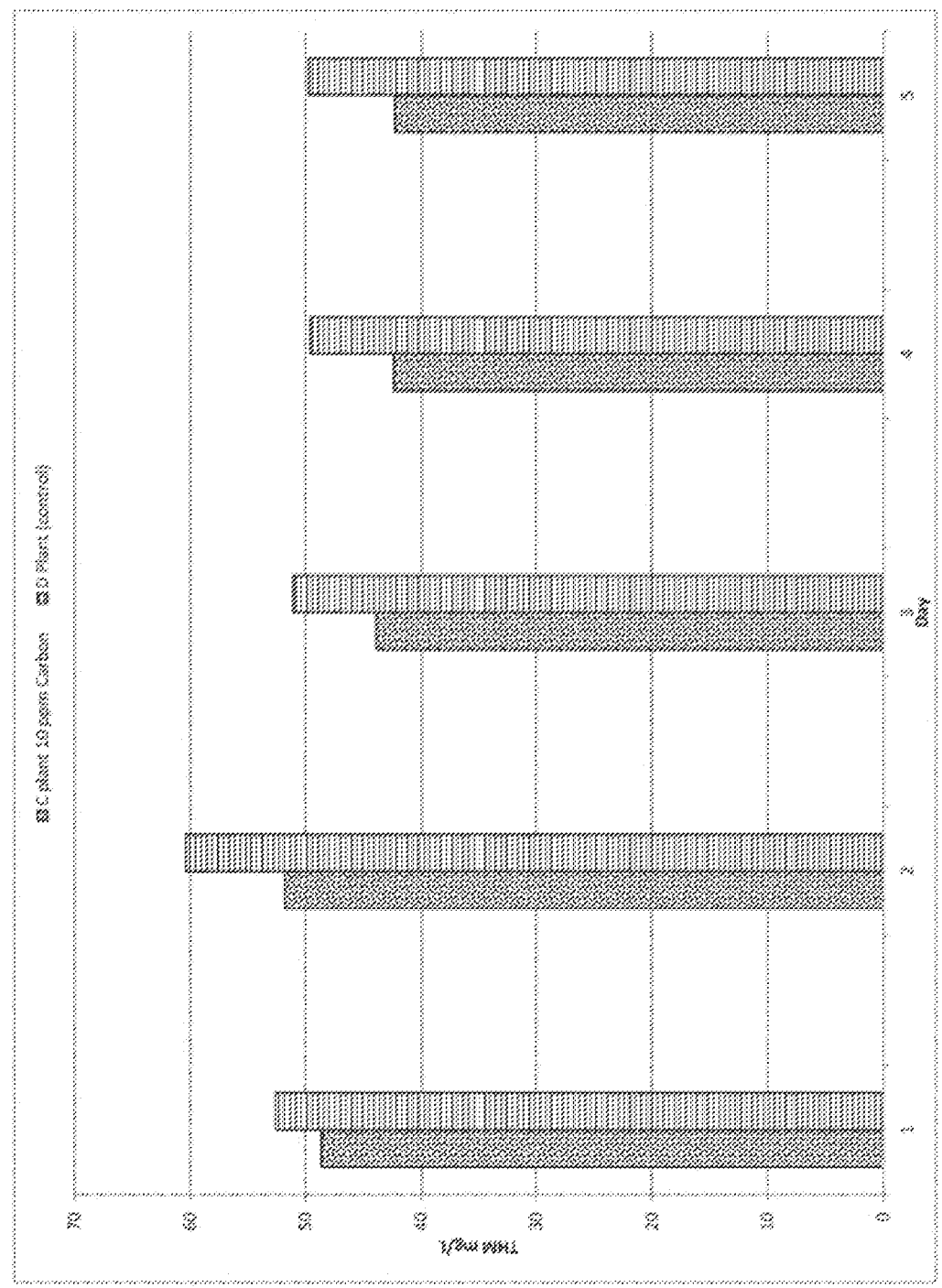
FIG. 2 is a chart illustrating the THC results of the experiment discussed in example 1.
Figure 4:
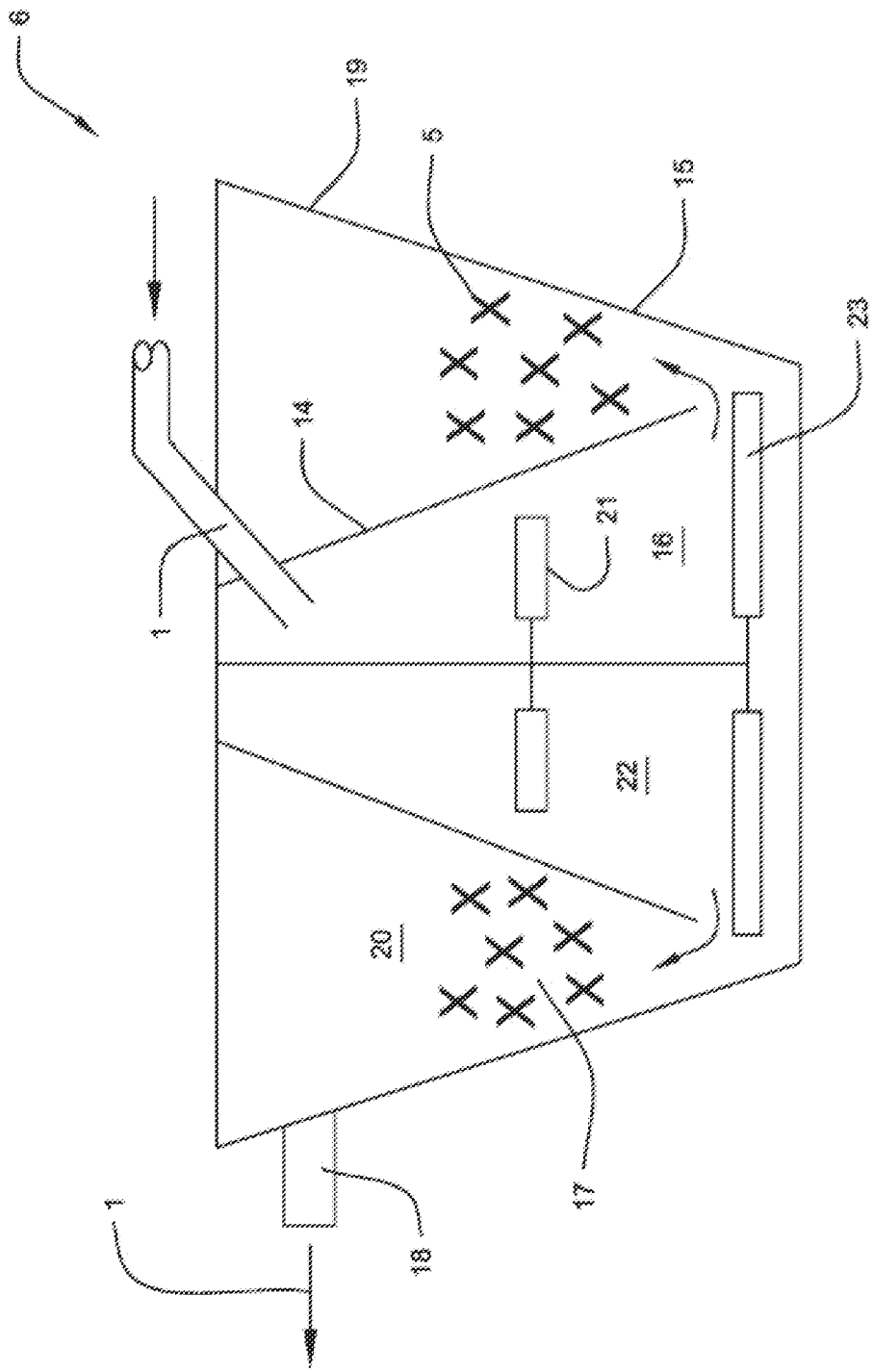
FIG. 4 is a cut away view of an up-flow clarifier.

THM was measured in each sample. The results are provided in FIG. 2. As can be seen, THM content was uniformly lower in the sample in which activated carbon was added. It is not clear whether the difference is attributable to THM being captured by the activated carbon or to less THM being produced because of the removal of organic carbon by the activated carbon or to some combination thereof. However, it is clear that the addition of activated carbon to the stream both reduced the total amount of oxidizing agent required to treat the stream and the amount of THM present in the treated stream.

These and other improvements to the treatment of water will be apparent to those of skill in the art from the foregoing disclosure and drawings and are intended to be encompassed by the scope and spirit of the following claims.

We claim:

1. A method of forming a concentrated activated carbon slurry comprising:
    adding activated powdered carbon to an aqueous solution at concentrations of at least about 200 gm of said activated powdered carbon per liter of said aqueous solution;

maintaining sufficient turbulence in said aqueous solution to keep said powdered carbon suspended in said solution;

introducing an aqueous suspension agent to said turbulent aqueous solution, wherein not more than an amount of said suspension agent equal to about 0.02 percent of the volume of said turbulent aqueous solution is added to said turbulent aqueous solution per minute, and wherein said suspension agent comprises water and at least about 0.1 percent by weight of a polymer selected from the group consisting of polyacrylamide, phosphino carboxylic acid, and combinations thereof, and continuing said introduction until said polymer comprises about 1.0 percent by weight of said aqueous solution.

2. A method of forming a concentrated activated carbon slurry according to claim 1 wherein said aqueous suspension agent is formed at least about 24 hours before said aqueous suspension agent is added to said turbulent aqueous solution.

3. A method of forming a concentrated activated carbon slurry according to claim 1 wherein said phosphino carboxylic acid has a molecular weight between about 500 and about 10,000.

4. A method of forming a concentrated activated carbon slurry according to claim 3 wherein said phosphino carboxylic acid has a molecular weight between about 3000 and about 4000.

5. A method of forming a concentrated activated carbon slurry according to claim 1 wherein said activated carbon has a plurality of pores, and wherein said pores have an average diameter of at least about 2.2 nm.

6. A method of forming a concentrated activated carbon slurry according to claim 5 wherein said activated powdered carbon comprises activated carbon formed from lignite coal.

7. A concentrated activated carbon slurry comprising:
an aqueous solution comprising between about 0.1 percent and 2.0 percent by weight polymer, wherein the polymer is selected from the group consisting of polyacrylamide having a molecular weight between about 8,000,000 and 12,000,000; phosphino carboxylic acid; and combinations thereof;
at least about 200 gm powdered activated carbon per liter of said aqueous solution; and
wherein at least about 90 percent of said powdered activated carbon is suspended in said slurry, and wherein said slurry is configured to maintain said suspension upon the application of sufficient agitation to create an average bulk fluid velocity within said slurry of about 6 feet per minute.

8. A concentrated activated carbon slurry according to claim 7 wherein said phosphino carboxylic acid has a molecular weight between about 500 and about 10,000.

9. A concentrated activated carbon slurry according to claim 8 wherein said phosphino carboxylic acid has a molecular weight between about 3000 and about 4000.

10. A concentrated activated carbon slurry according to claim 7 wherein said activated carbon has a diameter of less than about 45 micrometers prior to incorporation of said powdered activated carbon into said slurry.

11. A concentrated activated carbon slurry according to claim 7 wherein said powdered activated carbon has an average pore size of at least about 2.2 nm prior to incorporation of said powdered activated carbon into said slurry.

12. A concentrated activated carbon slurry according to claim 11 wherein said powdered activated carbon comprises activated carbon formed from lignite coal.

13. A concentrated activated carbon slurry according to claim 7 wherein said aqueous solution comprises between about 0.1 and about 1.50 percent by weight polymer.

14. A concentrated activated carbon slurry according to claim 7 wherein said aqueous solution comprises between about 0.1 and about 0.8 percent by weight polymer.

15. A concentrated activated carbon slurry comprising:
an aqueous solution comprising between about 0.1 percent and 2.0 percent by weight polymer, wherein the polymer is selected from the group consisting of polyacrylamide having a molecular weight between about 8,000,000 and 12,000,000; phosphino carboxylic acid; and combinations thereof;
at least about 200 gm powdered activated carbon per liter of said aqueous solution; and
wherein at least about 90 percent of said powdered activated carbon is suspended in said slurry, and wherein said slurry is configured to maintain said suspension upon the application of sufficient agitation to create an average bulk fluid velocity within said slurry of about 12 feet per minute.

16. A concentrated activated carbon slurry according to claim 15 wherein said phosphino carboxylic acid has a molecular weight between about 500 and about 10,000.

17. A concentrated activated carbon slurry according to claim 15 wherein said phosphino carboxylic acid has a molecular weight between about 3000 and about 4000.

18. A concentrated activated carbon slurry according to claim 15 wherein said activated carbon has a diameter of less than about 45 micrometers prior to incorporation of said powdered activated carbon into said slurry.

19. A concentrated activated carbon slurry according to claim 15 wherein said powdered activated carbon has an average pore size of at least about 2.2 nm prior to incorporation of said powdered activated carbon into said slurry.

20. A concentrated activated carbon slurry according to claim 19 wherein said powdered activated carbon comprises activated carbon formed from lignite coal.

21. A concentrated activated carbon slurry according to claim 15 wherein said aqueous solution comprises between about 0.1 and about 1.50 percent by weight polymer.

22. A concentrated activated carbon slurry according to claim 15 wherein said aqueous solution comprises between about 0.1 and about 0.8 percent by weight polymer.

23. A concentrated activated carbon slurry comprising:
an aqueous solution in a container wherein the solution comprises between about 0.1 percent and 2.0 percent by weight polymer, wherein the polymer is selected from the group consisting of polyacrylamide having a molecular weight between about 8,000,000 and 12,000,000; phosphino carboxylic acid; and combinations thereof;
at least about 200 gm powdered activated carbon per liter of said aqueous solution, substantially all of which is positioned at the bottom of said container; and
wherein said solution configured to suspend at least about 90 percent of said powdered activated carbon upon the application of sufficient agitation to create an average bulk fluid velocity within said solution of about 6 feet per minute.

24. A concentrated activated carbon slurry according to claim 23 wherein said phosphino carboxylic acid has a molecular weight between about 500 and about 10,000.

25. A concentrated activated carbon slurry according to claim 24 wherein said phosphino carboxylic acid has a molecular weight between about 3000 and about 4000.

26. A concentrated activated carbon slurry according to claim 23 wherein said activated carbon has a diameter of less than about 45 micrometers prior to incorporation of said powdered activated carbon into said slurry.

27. A concentrated activated carbon slurry according to claim 23 wherein said aqueous solution comprises between about 0.1 and about 1.50 percent by weight polymer.

28. A concentrated activated carbon slurry according to claim 23 wherein said aqueous solution comprises between about 0.1 and about 0.8 percent by weight polymer.

29. A concentrated activated carbon slurry comprising:
an aqueous solution in a container wherein the solution comprises between about 0.1 percent and 2.0 percent by weight polymer, wherein the polymer is selected from the group consisting of polyacrylamide having a molecular weight between about 8,000,000 and 12,000,000; phosphino carboxylic acid; and combinations thereof;
at least about 200 gm powdered activated carbon per liter of said aqueous solution, substantially all of which is positioned at the bottom of said container; and
wherein said solution is configured to suspend at least about 90 percent of said powdered activated carbon upon the application of sufficient agitation to create an average bulk fluid velocity within said solution of about 12 feet per minute.

30. A concentrated activated carbon slurry according to claim 29 wherein said phosphino carboxylic acid has a molecular weight between about 500 and about 10,000.

31. A concentrated activated carbon slurry according to claim 30 wherein said phosphino carboxylic acid has a molecular weight between about 3000 and about 4000.

32. A concentrated activated carbon slurry according to claim 29 wherein said activated carbon has a diameter of less than about 45 micrometers prior to incorporation of said powdered activated carbon into said slurry.

33. A concentrated activated carbon slurry according to claim 29 wherein said aqueous solution comprises between about 0.1 and about 1.50 percent by weight polymer.

34. A concentrated activated carbon slurry according to claim 29 wherein said aqueous solution comprises between about 0.1 and about 0.8 percent by weight polymer.

* * * * *